Sept. 3, 1957 F. G. GREENBERG 2,805,387

HIGH VOLTAGE TESTER FOR TELEVISION RECEIVERS

Filed Sept. 20, 1954

INVENTOR.
FREDERIC G. GREENBERG
BY James and Franklin
ATTORNEYS.

2,805,387

HIGH VOLTAGE TESTER FOR TELEVISION RECEIVERS

Frederic G. Greenberg, Poughkeepsie, N. Y.

Application September 20, 1954, Serial No. 457,170

1 Claim. (Cl. 324—20)

This invention relates to the servicing of television receivers, and more particularly to a high voltage tester for that purpose.

If the picture tube of a television receiver does not light up, or is dim, or lights faultily, as for example the illumination falls off instead of going up when the brightness control is increased, the service man suspects the high voltage supply. This high voltage supply is obtained from a rectifier tube followed by a filter stage. The filament of the tube is itself heated by current obtained from a low voltage secondary, say a single loop of wire forming a part of the horizontal output or so-called "flyback transformer." The plate of the rectifier tube is connected to the said transformer, thus providing a localized power supply at a very high potential level.

The difficulty with the picture tube may arise in the tube, or in the condenser of the filter section following the tube, or in the resistor of said section, or in the filament heater winding of the transformer, or the difficulty may lie further back in the receiver, for, as previously explained, the high voltage supply is itself taken from the horizontal scanning circuit.

In accordance with my invention I make possible a quick and foolproof test, by substitution of the high voltage power supply. The primary object of my invention is to provide a test unit which supplies a substitute high voltage potential to the anode socket of the picture tube. The test unit is readily applied to the receiver, and if the latter then functions properly, the service man knows that the difficulty is localized in the high voltage supply, and that he need not concern himself with the horizontal scanning circuit.

A further object of the invention is to provide such a unit which is simple, compact, light-weight, and inexpensive. Still another object is to provide the same with leads and connections which make it possible to readily and quickly insert the substitute supply in place of the regular supply.

The tester includes a substitute rectifier tube, typically a Type 1X2, and a flashlight type cell to energize the filament of the tube. The necessary duration of use is so slight that the life of the cell may correspond substantially to its shelf life, which may be as much as two years, provided that the tube is energized only when actually needed. On the other hand, the cell may be exhausted in one or two days if the tube is accidentally left on continuously. A further object of the invention is to overcome this difficulty, which I do by the provision of a switch which is normally open, and which is closed only when the tester is in actual use. A further object is to arrange for automatic closing and opening of the said switch.

To accomplish the foregoing general objects, and other more specific objects which will hereinafter appear, my invention resides in the high voltage tester elements, and their relation one to another, as are hereinafter more particularly described in the following specification. The specification is accompanied by a drawing, in which.

Figures 1, 2, 3:
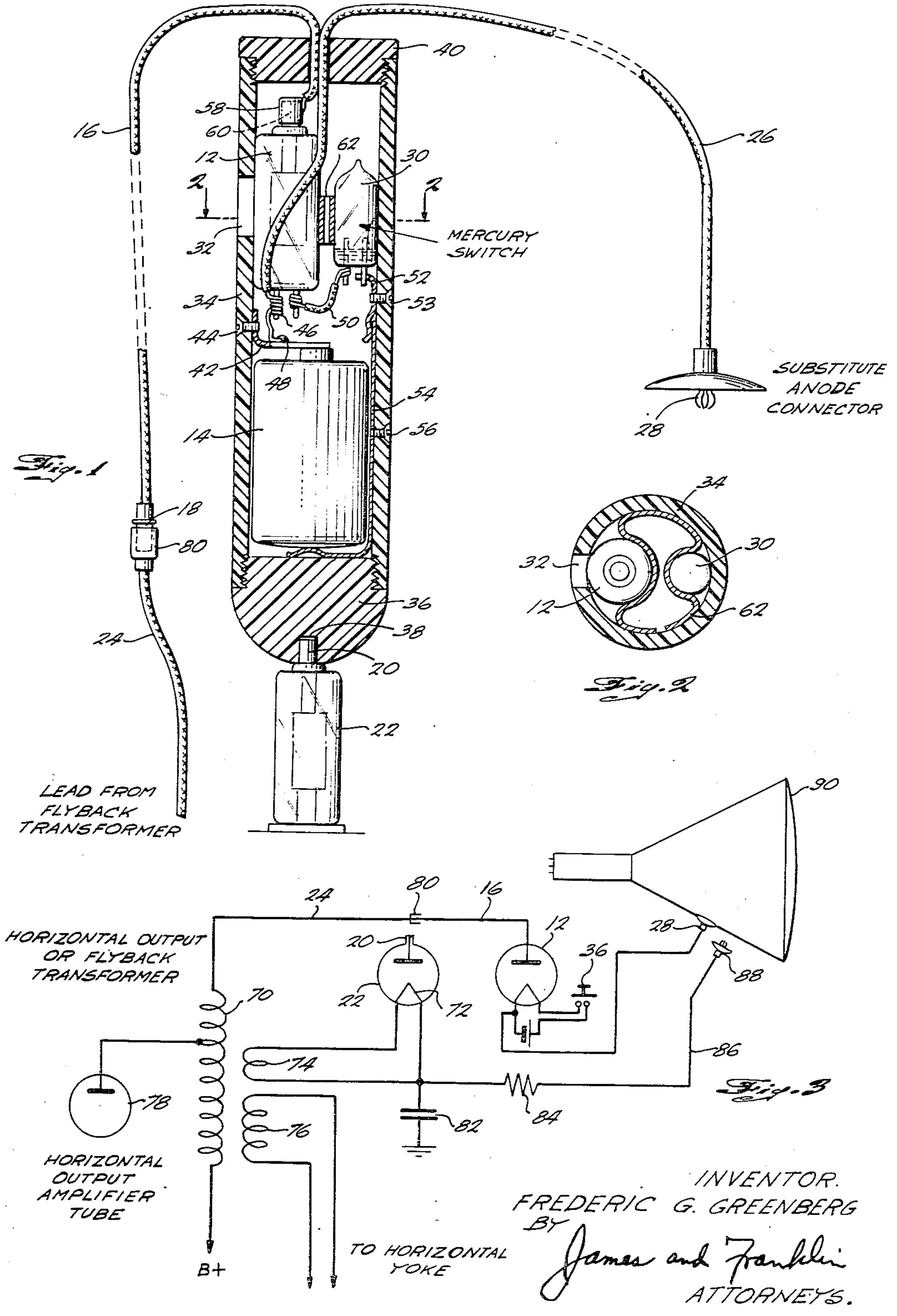
Fig. 1 is a vertical section through a high voltage tester embodying features of my invention.
Fig. 2 is a horizontal section taken approximately in the plane of the line 2—2 of Fig. 1.
Fig. 3 is a circuit diagram explanatory of the method of use of the invention.

Referring to the drawing, and more particularly to Fig. 1, the high voltage tester comprises a rectifier tube 12 and a flashlight type cell 14. There is also a means 16, in this case a flexible lead terminating in a cap 18 which is like the anode cap 20 of the rectifier tube 22 of the receiver, to facilitate transfer of the flyback transformer lead 24 from the receiver tube 22 to the tester tube 12. There is also a flexible anode connector lead 26 extending from a cathode or filament terminal of the tester tube 12, and terminating in a standard clip 28 of the type used for connection to the anode socket of the television picture tube.

The tester preferably includes a normally open switch 30 in the circuit between the cell 14 and the tube 12, so that the tube will be heated only when desired. A window 32 is preferably provided in the wall 34 of the housing containing the parts of the tester, so that the service man can see whether the tube is being energized. The switch 30 might be a pushbutton switch, as is indicated schematically at 36 in Fig. 3, but I prefer to employ a switch which is automatically operated, and for this purpose the switch 30 is a mercury switch.

The parts of the tester are mounted in a relatively elongated housing. In the present case it is a cylindrical housing, made of insulation capable of withstanding the high voltages used on the anode of a picture tube, say fifteen kilovolts, and of suitable diameter to receive a standard flashlight cell 14. The tube 12 and switch 30 are disposed above the flashlight cell. The switch is so oriented in the housing that it is closed when the housing is upright, as shown in the drawing, but otherwise is open. To help guard against unintended closing of the switch the lower end 36 of the housing is so shaped that the housing will not normally remain upright. As here illustrated the lower end 36 is substantially hemispherical. However, it is provided with a hole 38 dimensioned to fit over the anode cap 20 of the receiver rectifier tube 22, thus holding the housing in erect position and so closing the circuit during the actual substitution test.

In the specific structure here illustrated the housing is a length of tubular insulation which is threaded at its lower end to receive the bottom cap 36, which is also made of high voltage insulation. The upper end of the body 34 is threaded or otherwise arranged to receive a top cap 40, through which the conductors 16 and 26 pass. A metal bracket 42 is secured intermediate the ends of the cylinder, as by means of an insulation screw 44. The tube 12 may be mounted in a regular tube socket, but in the present case no socket is provided. Only two of the pins are used, and the remaining pins may be cut off if desired. The inner end of wire 26 is twisted about and soldered to one of the tube pins, as indicated at 46, and an additional length of the same conductor extends downward and is soldered to the bracket 42, as indicated at 48.

A short lead 50 is connected between and soldered to the other tube pin and on of the terminals of the mercury switch 30. A strip of spring metal 52 is bent as shown in the drawing, and is secured in position by an insulation screw 53. The upper end of strip 52 bears resiliently against one terminal of the mercury switch 30. It is preferably notched or bifurcated to straddle the pin. The lower end is bent to resiliently bear against the upper end of another spring strip 54. The latter is held in position by an insulation screw 56, and its lower end is bent radially inward to bear against the bottom of the cell 14. The insulation screws may be made of Bakelite or equivalent insulation. Metal screws may be used, but in such case a removable sleeve of insulation should be added around the cylinder 34 at the screws.

The inner end of conductor 16 is provided with a clip 58 which is fitted over the anode cap 60 of tube 12. The tube and switch are so light that they would remain in desired position by reason of the soldered connections alone, but they are additionally supported in proper position by means of a band of resilient metal which is bent to somewhat dumbbell configuration, as shown at 62 in Fig. 2. This occupies much of the space between the tube 12, the switch 30, and the cylindrical casing 34, and resiliently supports the tube and switch in desired position.

The structure is preliminarily assembled except for the spring strip 54 and the cell 14. The spring strip and cell are then inserted together and secured by the screw 56, following which the cap 36 is added to complete the structure.

Referring now to Fig. 3, the horizontal output or flyback transformer is represented at 70. The high voltage tube or rectifier 22 is usually a type 1X2 or a type 1B3. Its filament 72 is heated by means of a single loop or equivalent low voltage secondary 74 forming a part of transformer 70, and providing a voltage of, say, 1.2 volts. The secondary 76 is connected to the horizontal yoke. The transformer is itself supplied from a horizontal output amplifier tube, symbolized at 78. This tube is ordinarily a type 6BQ6 or 6BG6. The high voltage terminal of transformer 70 normally is connected through lead 24 and clip 80 to the anode cap 20 of the rectifier tube 22.

The high voltage output is filtered by means of a condenser 82 and a resistor 84. The condenser 82 may be of the order of 500 mmf. and is usually a ceramic cartwheel condenser designed to withstand a voltage of, say, 20 kilovolts. The resistor 84 may be of the order of 1 megohm. It is connected through an anode connector 86 to a clip 88 which normally is pushed into the high voltage anode socket of the picture tube 90.

On examining a television receiver the picture tube of which does not light up, or lights faultily, the service man can readily test the high voltage supply by substitution. For this purpose he simply removes the clip 80 from the anode cap 20, and instead places it over the end of conductor 16 of the tester. The clip 88 is detached from the picture tube, and instead the clip 28 of the tester is applied. The tester unit is stood upright on the anode cap 20, thus closing the mercury switch and energizing the rectifier tube in the tester.

These simple and expeditious steps provide a substitute high voltage supply, and the set will immediately function properly if the trouble lies in the high voltage supply.

Ordinarily the service man then will change the rectifier tube 22 to see whether the difficulty is in that tube. In some cases he may prefer to change the tube 22 even befor applying the tester. Assuming that the tube 22 is satisfactory, the difficulty then will lie in either the filter condenser 82, the filter resistor 84, or the filament supply loop 74 of the transformer, and these parts must then be individually tested. The benefit of my tester is that in making these tests there is assurance that the work will not be wasted, for the trouble almost certainly lies in one of these components. Without my substitution test, one would not know but that the difficulty lies further back in the horizontal scanning circuit itself.

Under certain circumstances the present tester will also reveal trouble back in the horizontal scanning circuit. For example, when the tester is applied some picture may be seen on the screen, but the width of the pattern may not be as great as it should be, or/and the illumination may be dim, or/and the picture may not "lock in," all of which will reveal to the service man the fact that the difficulty lies in the horizontal scanning circuit, rather than in the high voltage circuit. He will then work on the horizontal scanning circuit first. If desired the tester may be left in circuit during further trouble shooting, thus permitting the service man to concentrate on horizontal scanning, so that on correcting the difficulty a good picture will immediately result. In such case when the test unit is removed a good picture will continue, but in rare cases, if not, that fact would signify that there is additional and simultaneous trouble in the high voltage circuit itself.

It is believed that the construction and method of use of my high voltage tester for television receivers, as well as the advantages thereof, will be apparent from the foregoing detailed description. The unit helps test for a short circuit in or leakage of the cartwheel filter condenser in the high voltage supply, or an open filter resistor or a defective filter resistor in the high voltage supply, or a short circuit in or a breakdown of the filament loop for the high voltage rectifier, or defects in the high voltage rectifier tube whether shorted, leaky or dead. It will further test for regulation of the flyback transformer or horizontal output stage, or the drive to the horizontal output amplifier from the oscillator, for by removing the high voltage load from the flyback transformer in many types of horizontal scanning trouble where normally no raster appears on the picture tube, enough high voltage pulse can be rectified by my tester to show some form of raster on the screen, thus considerably facilitating further trouble shooting.

To apply the tester it is merely necessary to remove the plate lead of the high voltage rectifier and to place it on one of the leads from the tester which terminates in the same type of male plate cap. The high voltage anode clip is removed from the picture tube and replaced by the anode connector from the tester. The tester is mounted by placing its base on the plate cap of the high voltage rectifier tube, for which purpose a special hole is made in one end of the tester, thus keeping the tester in vertical position, and so automatically closing the mercury switch.

When the tester is not in use it will not remain in vertical position, and the mercury switch is normally open.

It will be understood that while I have shown and described the invention in a preferred form, changes may be made in the structure disclosed, without departing from the scope of the invention, as sought to be defined in the following claim.

I claim:

A high voltage tester for television receivers, said tester comprising an elongated housing, a rectifier tube therein, a flashlight type cell therein to heat the cathode of the rectifier tube, a flexible lead from the anode cap of the tube and terminating in a cap like the cap of the tube to facilitate transfer of the flyback transformer lead from the receiver rectifier tube cap to the tester tube cap, a flexible television picture tube anode connector lead extending from the cathode of the tester tube and adapted to be connected to the anode socket of the television picture tube in substitution for the regular anode connector of the receiver, and a mercury switch connected in circuit between the cell and the tube, said mercury switch being so disposed that it is closed when the elongated housing is upright, the lower end of the housing being so shaped that the housing will not normally remain upright, said lower end of the housing being provided with a hole dimensioned to fit over the anode cap of the receiver rectifier tube, in order to help physically support the housing.

References Cited in the file of this patent

UNITED STATES PATENTS

| | | |
|---|---|---|
| 1,896,726 | Taylor | Feb. 7, 1933 |
| 2,205,352 | Fisher | June 18, 1940 |
| 2,552,981 | Lamb | May 15, 1951 |
| 2,680,834 | Burns | June 8, 1954 |
| 2,771,580 | Schott | Nov. 20, 1956 |